(12) United States Patent
Agrawal et al.

(10) Patent No.: US 7,904,418 B2
(45) Date of Patent: Mar. 8, 2011

(54) ON-DEMAND INCREMENTAL UPDATE OF DATA STRUCTURES USING EDIT LIST

(75) Inventors: Siddharth Agrawal, Santa Clara, CA (US); Robert C. Parker, Beijing (CN); Dachuan Zhang, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 562 days.

(21) Appl. No.: 11/599,085

(22) Filed: Nov. 14, 2006

(65) Prior Publication Data

US 2008/0114795 A1    May 15, 2008

(51) Int. Cl.
*G06F 7/00* (2006.01)
*G06F 17/00* (2006.01)
(52) U.S. Cl. .......................... 707/610; 707/690; 715/203
(58) Field of Classification Search .................. 707/203, 707/610, 690, 7; 709/248, 223, 203; 715/229; 714/5; 717/108; 713/400
See application file for complete search history.

(56) References Cited

U.S. PATENT DOCUMENTS

| | | | | |
|---|---|---|---|---|
| 5,369,669 | A * | 11/1994 | Tombal et al. | 375/242 |
| 6,493,721 | B1 | 12/2002 | Getchius et al. | 707/104.1 |
| 6,647,399 | B2 * | 11/2003 | Zaremba | 707/204 |
| 6,651,249 | B2 | 11/2003 | Waldin et al. | 717/170 |
| 6,763,474 | B1 * | 7/2004 | Boerstler et al. | 713/400 |
| 6,901,417 | B2 * | 5/2005 | Anglin et al. | 707/203 |
| 7,032,033 | B1 * | 4/2006 | Ledoux et al. | 709/248 |
| 7,082,443 | B1 | 7/2006 | Ashby | 707/201 |
| 7,089,238 | B1 | 8/2006 | Davis et al. | 707/5 |
| 7,240,091 | B1 * | 7/2007 | Hopmann et al. | 709/203 |
| 2002/0116582 | A1 | 8/2002 | Copeland et al. | 711/133 |
| 2003/0028557 | A1 | 2/2003 | Walker et al. | 715/500 |
| 2003/0191781 | A1 | 10/2003 | Civanlar et al. | 707/200 |
| 2004/0044702 | A1 * | 3/2004 | Ferreira Alves et al. | 707/203 |
| 2004/0103141 | A1 * | 5/2004 | Miller et al. | 709/203 |
| 2006/0015561 | A1 | 1/2006 | Murphy et al. | 709/206 |
| 2006/0085532 | A1 * | 4/2006 | Chu et al. | 709/223 |
| 2006/0161601 | A1 | 7/2006 | Barrs et al. | 707/203 |

(Continued)

OTHER PUBLICATIONS

Liu, Yanhong A., "Efficient Computation Via Incremental Computation," Dec. 1999, pp. 1-24. http://www.cs.berkeley.edu/~aj/cs/cs265/liu99incremental.ps.

(Continued)

*Primary Examiner* — Jay A Morrison
*Assistant Examiner* — Bao G Tran
(74) *Attorney, Agent, or Firm* — Merchant & Gould

(57) ABSTRACT

An edit list including a collection of change descriptions and definitions for a primary data structure is used for on-demand, incremental updating of associated auxiliary data structures. Edits performed on the primary data structure are recorded in the edit list with a version stamp, along with definitions of the changes and any other pertinent data. Each auxiliary data structure maintains its own version stamp that identifies when the auxiliary data structure was last synchronized with the primary data structure. When an auxiliary data structure needs to be updated, the edit list is retrieved and change descriptions scanned to find one with the matching version stamp. All change descriptions logged since that one are incorporated into the auxiliary data structure. The specific contents of each change description enable the auxiliary data structure to be incrementally updated as each change description is processed individually.

20 Claims, 8 Drawing Sheets

U.S. PATENT DOCUMENTS

| | | | |
|---|---|---|---|
| 2006/0161909 A1 | 7/2006 | Pandey et al. | 717/168 |
| 2006/0173861 A1 | 8/2006 | Bohannon et al. | 707/100 |
| 2006/0200639 A1 | 9/2006 | Levy et al. | 711/162 |
| 2006/0206865 A1* | 9/2006 | Reinhardt et al. | 717/108 |
| 2007/0067358 A1* | 3/2007 | Barrs et al. | 707/203 |
| 2007/0180075 A1* | 8/2007 | Chasman et al. | 709/223 |
| 2007/0226734 A1* | 9/2007 | Lin et al. | 717/177 |
| 2009/0172201 A1* | 7/2009 | Carmel | 709/248 |

OTHER PUBLICATIONS

OfficeBliss Manual, Baker Health Associates plc, Leicester, LE8, 4GD, Great Britain. http://www.bhasoftware.com/officebliss/Downloads/OBlissManual.pdf.

BIM-Edit, Fantom Systems, http://www.fantomsystems.com/products.bimn-edit.htm.

* cited by examiner

ON-DEMAND INCREMENTAL UPDATE OF DATA STRUCTURES USING EDIT LIST

BACKGROUND

Auxiliary data structures are used to perform operations on portions or all of a primary data structure without consuming the original data structure. For example, an auxiliary data structure may include part or all of the contents of a text document and be used to perform operations such as analysis without the original text document being consumed by the analysis application. Hence, one or more updates may need to be performed on the auxiliary data structures in response to a series of edits made to the associated primary data structure.

One approach is to update the auxiliary data structures immediately in response to each edit performed on the primary data structure. This way incremental and hence efficient updates can be performed. However, a resource cost of updating all of the auxiliary data structures right away is incurred, when in some cases the results of those computations might not be required until a later time.

Another approach is to delay updating the auxiliary data structures for as long as possible, and then recomputing their new value based on the current state of the primary data structure. Often, however, due to multiple edits having occurred, it may become difficult for this to be an incremental operation, and the update may become overly time consuming.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to using an edit list comprising a collection of change descriptions for a primary data structure in incrementally updating associated auxiliary data structures. Each edit performed on the primary data structure may be recorded in the edit list with a version stamp, along with any other data pertinent to the particular edit. Each auxiliary data structure may maintain its own version stamp that identifies when the auxiliary data structure was last synchronized with the primary data structure. When an auxiliary data structure is to be updated, the current edit list may be retrieved and the change descriptions since the last one with matching version stamps may be incorporated into the auxiliary data structure.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, an edit list comprising a collection of change descriptions for a primary data structure may be used to incrementally update associated auxiliary data structures. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Figure 1:
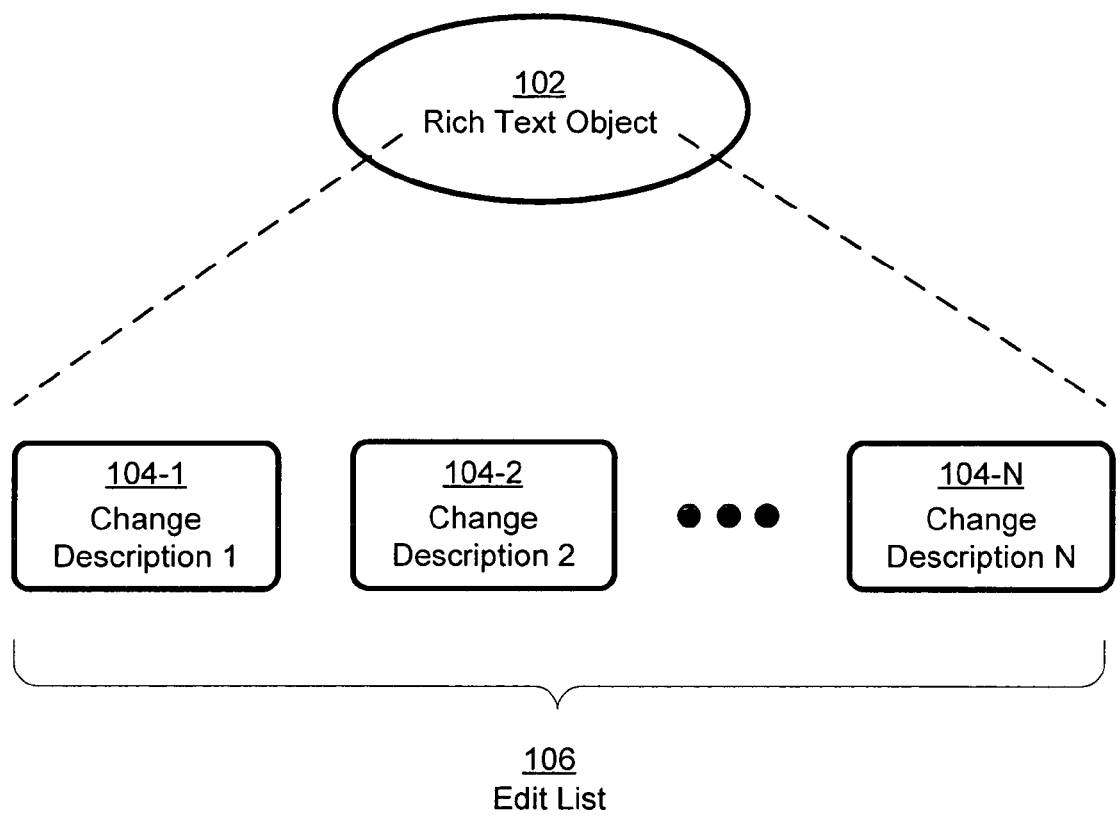
FIG. 1 illustrates a conceptual diagram of an edit list maintained by a rich text object.

Referring to FIG. 1, a conceptual diagram of an edit list maintained by a rich text object is illustrated. While incremental updating of auxiliary data structures using an edit list based on changes to a primary data structure may be implemented in any paradigm that includes a primary data structure and associated auxiliary data structures, a specific example implementation in text processing is discussed below.

According to some embodiments, an example incremental auxiliary data update system may be implemented in a text processing application. The primary data structure (rich text object 102) in the example system may comprise a linear stream of characters together with a description of the type of formatting applied to contiguous sequences of those characters. During edits, characters may be added, removed, or formatted. Each possible type of edit may be represented by a change description (e.g. change description 1 through N) that includes a starting index and a count of characters affected by the edit. Multiple auxiliary data structures may be managed by the system for various purposes and utilize the edit list 106. For example, a data structure may represent the formatted text along with additional formatting based on a document style template, another data structure may be used to control layout and display of the text, and a further data structure may be used to dynamically track the index position of a particular character as the text is edited.

Each of these auxiliary data structures may be updated incrementally and on-demand using edit list 106 maintained by the primary data structure (rich text object 102). By using edit list 106 to first store the edits and then to provide them to the auxiliary data structures on-demand, updating of auxiliary data structures is decoupled from modifications to the primary data structure. Recomputation of auxiliary data structures may be delayed until when it is needed, yet still be performed in an efficient manner. Moreover, use of a version stamp ensures that subsequent updates to auxiliary data structures can be performed rapidly, since once an update is performed and the primary and auxiliary data structures are synchronized, future updates to auxiliary structures need to consider only new entries to the edit list that were created since the time of last update. Decoupling of auxiliary and primary data structures also eliminates a need for notifications of when changes occur to the primary structure, thereby reducing a complexity of the overall architecture.

Edit list 106 is a data structure that is designed to include of a series of change descriptions (104-1 through 104-N). A change description is a data structure that specifies what change occurred to the text. According to embodiments, each change description may contain a version stamp. The version stamp may correspond to a state of the rich text object 102 immediately prior to an edit. In one embodiment, the rich text object 102 may be responsible for maintaining and updating its version stamp in response to each edit that can modify its state. Similarly, the auxiliary data structure may be responsible for capturing the version stamp that was in effect the last time it was updated from the primary data structure. In another embodiment, the version stamps may be maintained and updated by a separate update module.

Every edit that modifies the state of the rich text object 102 may create a corresponding change description appended to the edit list. According to further embodiments, the edit list may include three kinds of change descriptions:

(1) Body change: This may occur, for example, when the document style is changed and represent a drastic change that generally requires a full recalculation of all auxiliary data structures that depend on formatting of the rich text, such as text layout and display.

(2) Text added or removed: This may occur, for example, when a contiguous sequence of characters is selected and replaced by pasting text from another source. Text addition or removal may specify a starting character index position, a number of characters deleted, and/or a number of characters inserted.

(3) Text formatting changed: This may occur, for example, when a contiguous sequence of characters is selected and bold formatting is applied. Formatting change may specify a starting character position and a number of characters affected.

As mentioned above, implementations of using edit list to update auxiliary data structures are not limited to text processing. Data structures including other types of data such as graphics, objects, images, and the like may also be updated using an edit list reflecting changes in the primary data structure. For example, a graphics application for generating and editing graphics files that contain shapes, images, and the like may utilize primary and auxiliary data structures for similar purposes as described previously. In that scenario, changes to the data such as addition or removal of graphics, formatting changes (e.g. line thickness, line or fill color, and the like) may also be provided to the auxiliary data structures using an edit list with version stamps.

Figure 2:
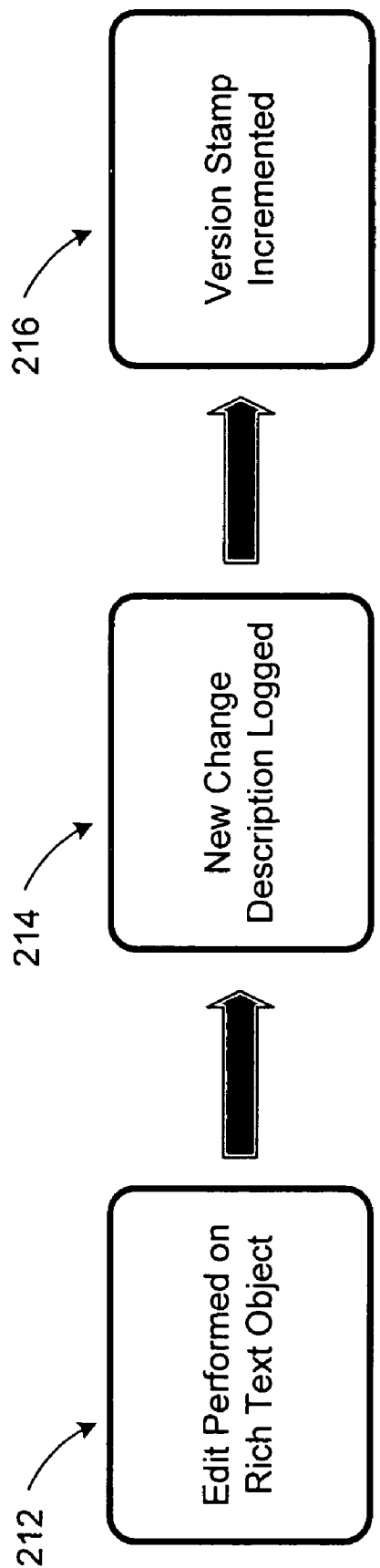
FIG. 2 illustrates a diagram of an example edit list maintenance process.

FIG. 2 illustrates a diagram of an example edit list maintenance process. The edit list may be maintained by the application processing the primary data structure, by an update module, or by a separate application in communication with the application processing the primary data structure.

According to some embodiments, an edit being performed on the rich text object (212) results in portions of the rich text object being modified in one of the ways described above (or in another manner). The changes or edits are logged in the edit list in step 214. Before recording the changes, the system may also include definitions of the changes in the edit list. In some implementations, an application consuming the auxiliary data structure may not necessarily recognize all edit types in the primary data structure. In such cases including the definitions may enable the application consuming the auxiliary data structure to recognize the new changes and perform appropriate actions. For example, a first application processing the primary data structure may be a full capacity word processing application, while the second application processing the auxiliary data structure may be a limited capability word processing application (e.g. one for a mobile device). Accordingly, the auxiliary data structure may include a subset of attributes of the original data. In this scenario, when a formatting change is made to the primary data structure that is not recognized by the second application, the edit list including a definition of the formatting change may help the second application to understand what kind of change is occurring and decide how to reflect that in processing the auxiliary data structure.

After the definitions and new change descriptions are recorded, the system may increment a version stamp associated with the primary data structure such that the auxiliary data structure can be compared to the primary using the edit list and updated. Optionally, the version stamp may be stored in the primary data structure and provided upon request to an update module.

Figure 3A:
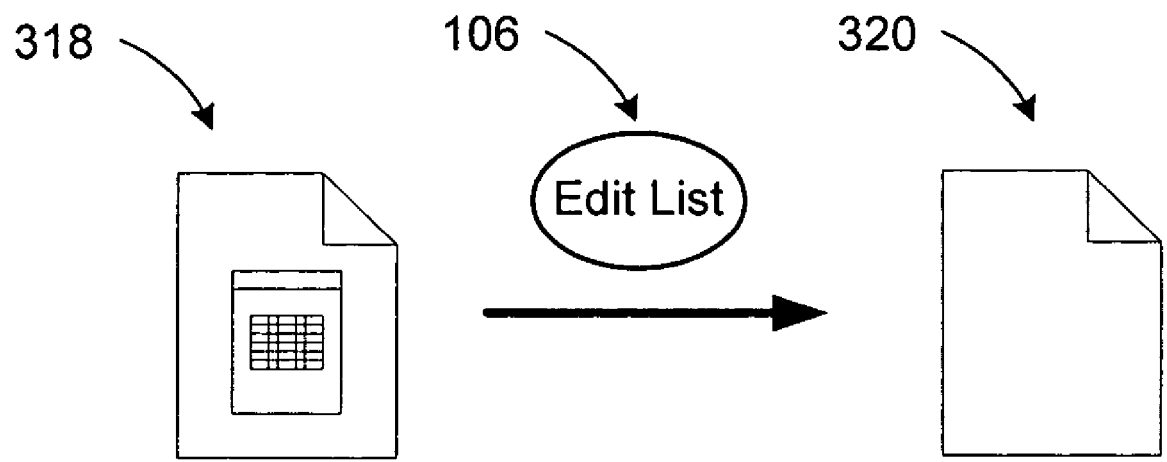
FIG. 3A is a conceptual diagram illustrating use of an edit list in updating an auxiliary data structure.

FIG. 3A is a conceptual diagram illustrating use of an edit list in updating an auxiliary data structure. Edit list 106 may be used to provide on-demand, incremental update services for auxiliary data structure 320 based on changes to primary data structure 318.

Edit list 106 may include definitions for change descriptions from primary data structure 318, the change descriptions themselves, a version stamp for the primary data structure and the version stamps for each of the auxiliary data structures. Thus, the edit list can be scanned for changes that were recorded after the last update of the auxiliary data structure and any additional changes incorporated into auxiliary data structure 320 on-demand. The version stamps are used to compare updates and determine changes since the last update.

Edit list 106 may be embodied as a virtual document preserved in RAM, an integral part of primary data structure 318, or a separate document such as an Extensible Markup Language (XML) document. Edit list 106 may be generated and maintained by an application that generates and/or maintains primary data structure 318.

Figure 3B:
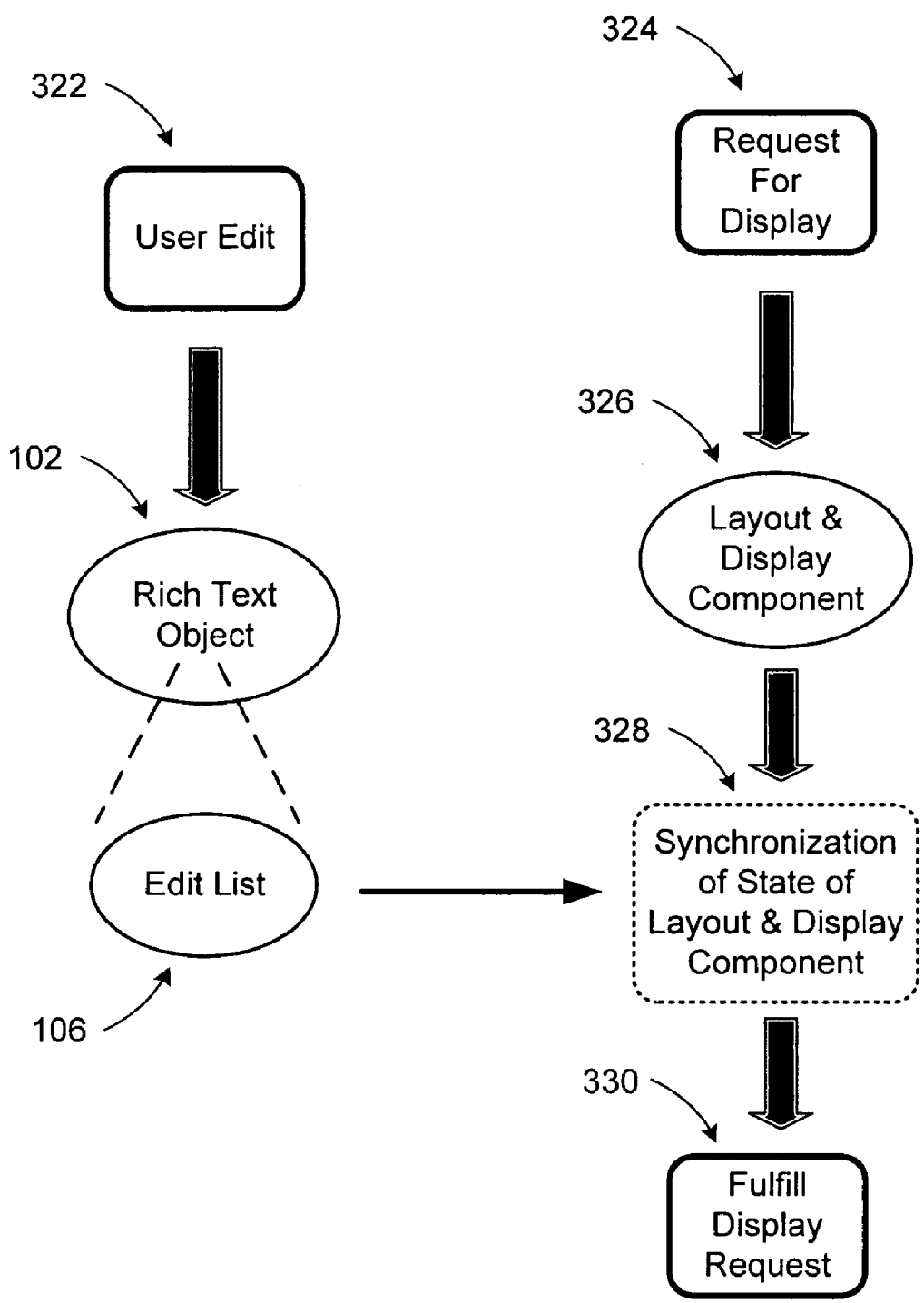
FIG. 3B illustrates a diagram of maintaining primary and auxiliary data structures with an edit list according to embodiments.

FIG. 3B illustrates a diagram of maintaining primary and auxiliary data structures with an edit list in a text processing environment according to embodiments. The example objects, data structures, and operations discussed below can be implemented in any platform using primary and associated auxiliary data structures.

The example text processing system may include a component (326) to perform layout and display of rich text. The data structure utilized by the layout and display component may differ from that maintained by the rich text object 102. Edit list 106 may be utilized as an efficient mechanism to synchronize the two data structures. As noted earlier, edits 322 to the primary data structure may occur at any time and be logged as change descriptions in the edit list 106. Similarly, the need to update the auxiliary data structure utilized by the layout and display component 326 may occur at any time, for example when a user display needs to be updated (324). When this need occurs, the synchronization process 328 may be invoked.

Synchronization process 328 may be performed as follows. A version stamp held by the auxiliary data structure, which represents the state of the primary data structure at the time of last update of the auxiliary data structure, may be first compared with the current version stamp of the primary data structure. If they match no updates are necessary. If there is no match, then edit list 106 may be retrieved from the primary data structure. Edit list 106 may be traversed starting from the end and working backwards to the beginning. Each time a change description is encountered, its version stamp may be compared with that of the auxiliary data structure. This search process continues until a matching version stamp is found. As long as the edit list maintains its integrity, a matching version stamp is bound to be detected. For example, in order to conserve memory, the edit list might get destroyed. In this case incremental update is not possible, and auxiliary data structures may need to handle not finding a matching version stamp. Once the match is found, edit list 106 may be traversed forward starting from the matching change description to the end of the list. For each change description encountered during this second scan, the auxiliary data structure may be incrementally updated to account for that particular change.

When all change descriptions are carried over to the auxiliary data structure, a native task of the auxiliary data structure may be performed such as fulfilling the display request (330) and updating the user display.

Figure 4:
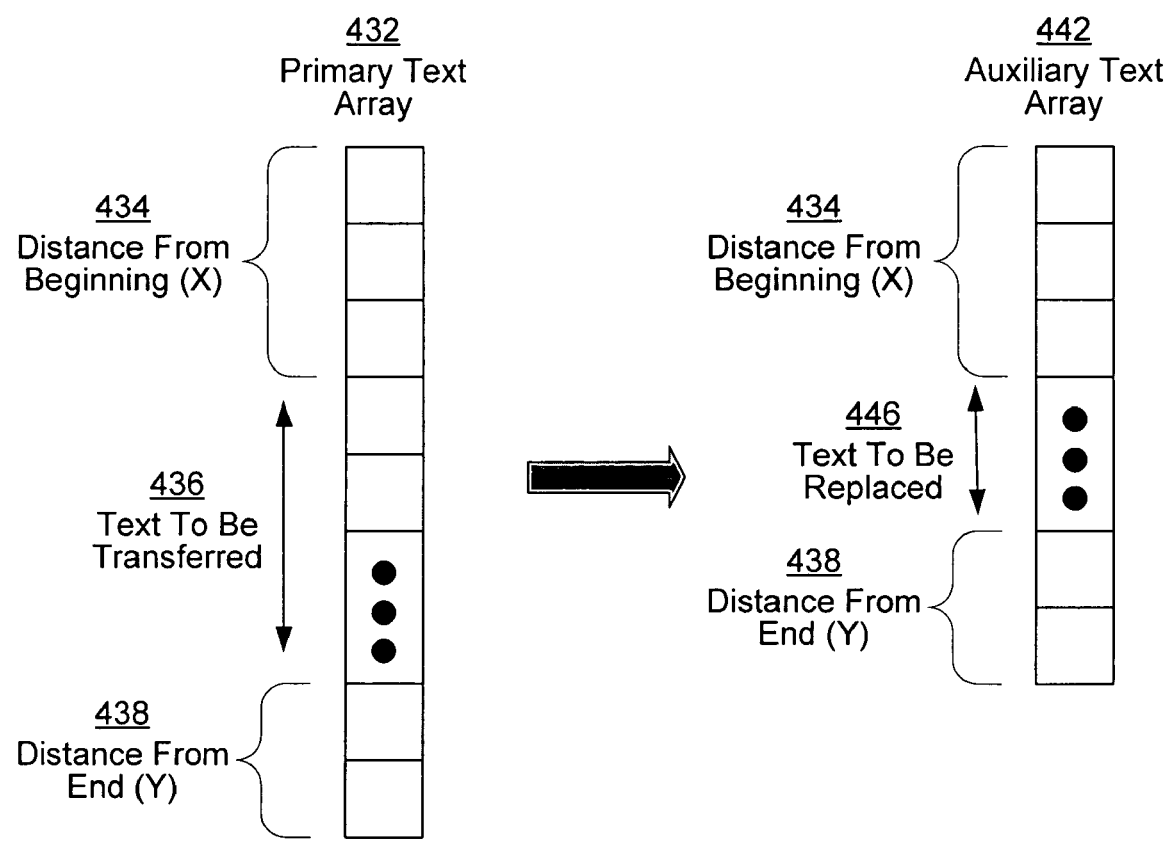
FIG. 4 illustrates incremental transfer of a single range of intervening text from a primary data structure to an auxiliary data structure.

FIG. 4 illustrates incremental transfer of a single range of intervening text from a primary data structure to an auxiliary data structure. According to some embodiments, a subgroup of change descriptions starting from the change description with a matching version stamp may be pre-processed using an inspection process. This may provide support to batch edits and reduce a complexity of the synchronization process. In one example implementation, the inspection process may render following information:

(I) a flag indicating whether a body change was encountered,
(II) a flag indicating whether text was added or removed,
(III) a flag indicating whether text was formatted,
(IV) a distance from the beginning of the character stream to the earliest character edited, and
(V) a distance from the end of the character stream to the furthest character edited.

Items (IV) and (V) above, taken together, identify a single contiguous range of characters in the rich text object that includes all the text that has been changed. Since the characters prior to item (IV) and the characters after item (V) are unchanged, their existing state may be preserved in the auxiliary data structure. The updated rich text may be transferred simply by copying the intervening text characters, together with their formatting, from the primary data structure to the auxiliary data structure. In the event that the body change flag is set, incremental update may not be possible since the auxiliary data structure has to be recomputed from scratch. If neither a body change nor a text add/remove change is encountered, but only text format changes have occurred, the update process may be further optimized by copying over only the formatting of each piece of affected text.

In FIG. 4, primary text array 432 is the example changed stream of characters. The portion affected by the change(s) is text to be transferred 436, which begins at a distance from the beginning X (434) and ends at a distance from the end Y (438). On the auxiliary data structure side, auxiliary text array 442 has text to be replaced 446, which also begins at a distance from the beginning X (434) and ends at a distance from the end Y (438). Thus, text to be replaced 446 is being replaced with a larger portion of text, namely, text to be transferred 436.

Embodiments are not limited to the example data structures and operations discussed above. Many other types of operations may be performed to implement on-demand incremental updating of auxiliary data structures with an edit list using the principles described herein.

Figure 5:
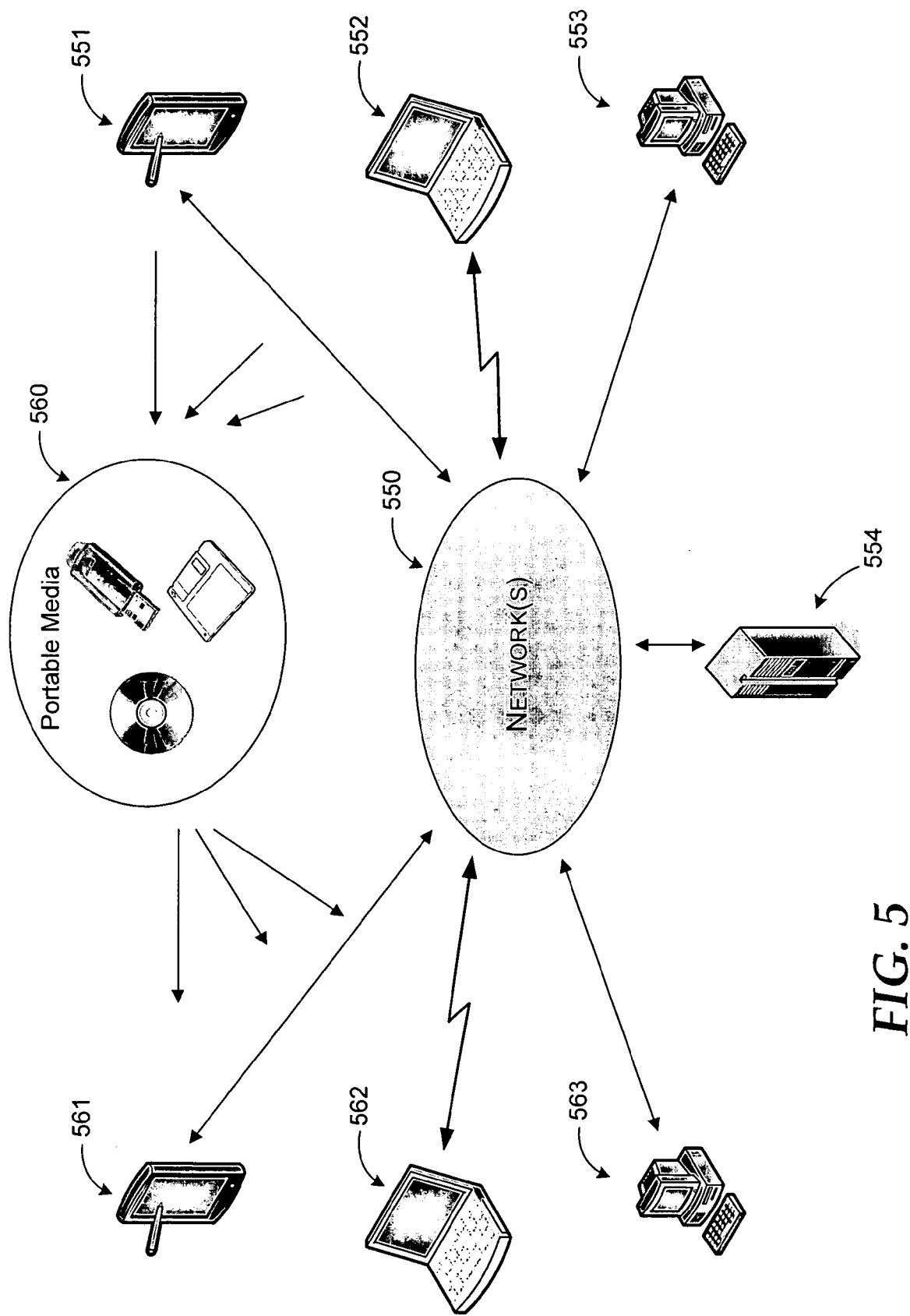
FIG. 5 illustrates use of an edit list to update auxiliary data structures associated with a primary data structure in a networked system.
Figure 6:
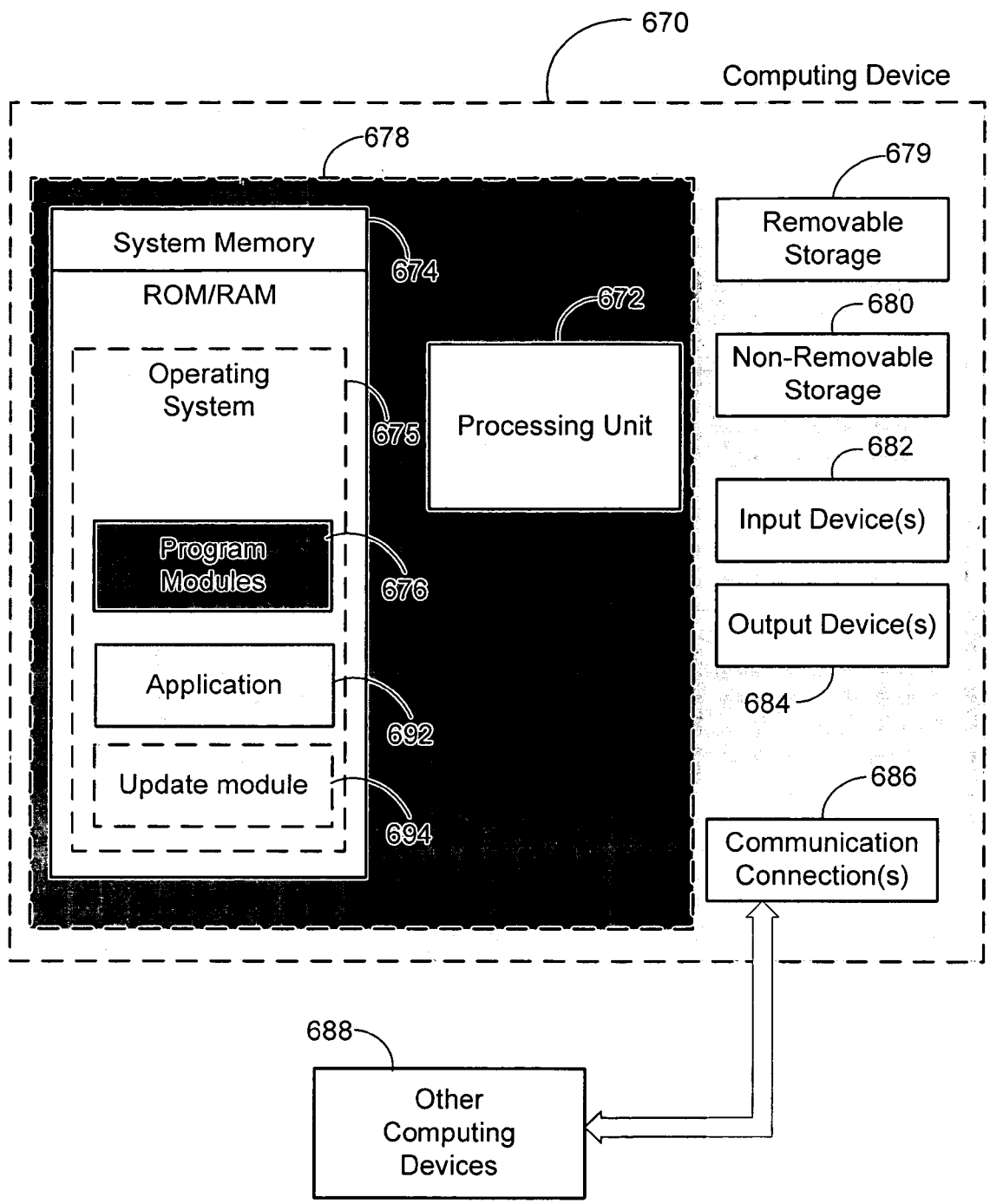
FIG. 6 is a block diagram of an example computing operating environment, where embodiments may be implemented.

Referring now to the following figures, aspects and exemplary operating environments will be described. FIG. 5, FIG. 6, and the associated discussion are intended to provide a brief, general description of a suitable computing environment in which embodiments may be implemented.

FIG. 5 illustrates use of an edit list to update auxiliary data structures associated with a primary data structure in a networked system. The system may comprise any topology of servers, clients, Internet service providers, and communication media. Also, the system may have a static or dynamic topology. The term "client" may refer to a client application or a client device employed by a user to perform operations associated with updating auxiliary data structures. While a networked auxiliary data structure update system may involve many more components, relevant ones are discussed in conjunction with this figure.

In a typical operation according to embodiments, a primary data structure such as a text document may reside on any one of client devices 551-553 or server 554. The primary data structure may be generated and/or edited by one or more applications executed on these devices. Furthermore, the applications generating or editing the primary data structure may be distributed. For example, a document may be generated by one application residing on one device and edited by one or more applications residing on other devices.

Client devices 551-553 or server 554 may be in communications with additional client devices 561-563 (also additional servers) over network(s) 550. Auxiliary data structures associated with the primary data structure may reside on additional client devices 561-563 and need to be updated based on changes to the primary data structure. For example, client device 561 may store an auxiliary data structure associated with a primary document on server 554 for displaying the primary document. Another auxiliary data structure may reside on client device 563 for printing the original primary document in a particular manner. Thus, both auxiliary data structures would have to be updated when changes are made to the primary document on server 554. The auxiliary data structures may be incrementally updated using an edit list according to embodiments as described previously. The edit list may be stored on server 554 in this example.

Another method of updating the auxiliary data structures is distributing the data structure(s) along with the associated edit list using portable storage media 560. Portable storage media 560 may include any method of storing and distributing files such as CD-ROMs, floppy disks, flash drives, and others. Client devices 561-563 may include an update module (separate or an integral part of an application consuming the auxiliary data structures) that upon receiving the edit list performs checking the version stamps, scanning of the change descriptions, and implementing applicable changes.

Network(s) 550 may include a secure network such as an enterprise network, an unsecure network such as a wireless open network, or the Internet. Network(s) 550 provide communication between the nodes described herein. By way of example, and not limitation, network(s) 550 may include wired media such as a wired network or direct-wired connection, and wireless media such as acoustic, RF, infrared and other wireless media.

Many other configurations of computing devices, applications, data sources, data distribution and analysis systems may be employed to implement incremental updating of auxiliary data structures using an edit list. Furthermore, the networked environments discussed in FIG. 5 are for illustration purposes only. Embodiments are not limited to the example applications, modules, or processes. A networked environment for incremental updating of auxiliary data structures using an edit list may be provided in many other ways using the principles described herein.

With reference to FIG. 6, a block diagram of an example computing operating environment is illustrated, such as computing device 670. In a basic configuration, the computing device 670 typically includes at least one processing unit 672 and system memory 674. Computing device 670 may include a plurality of processing units that cooperate in executing programs. Depending on the exact configuration and type of computing device, the system memory 674 may be volatile (such as RAM), non-volatile (such as ROM, flash memory, etc.) or some combination of the two. System memory 674 typically includes an operating system 675 suitable for controlling the operation of a networked personal computer, such as the WINDOWS® operating systems from MICROSOFT CORPORATION of Redmond, Wash. The system memory 674 may also include one or more software applications such as program modules 676, application 692, and update module 694.

Application 692 may be any application that generates primary data structure such as a word processing application that generates and edits a text-based document or a spreadsheet application that generates and edits spreadsheets. Update module 694 may perform one or more of generating the edit list, checking version stamps, and updating auxiliary data structures tasks. Update module 692 may be an integrated part of application 692 or operate remotely and communicate with the application and with other applications running on computing device 670 or on other devices. Furthermore, update module 694 or application 692 may be executed in an operating system other than operating system 675. This basic configuration is illustrated in FIG. 6 by those components within dashed line 678.

The computing device 670 may have additional features or functionality. For example, the computing device 670 may also include additional data storage devices (removable and/or non-removable) such as, for example, magnetic disks, optical disks, or tape. Such additional storage is illustrated in FIG. 6 by removable storage 679 and non-removable storage 680. Computer storage media may include volatile and non-volatile, removable and non-removable media implemented in any method or technology for storage of information, such as computer readable instructions, data structures, program modules, or other data. System memory 674, removable storage 679 and non-removable storage 680 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 670. Any such computer storage media may be part of device 670. Computing device 670 may also have input device(s) 682 such as keyboard, mouse, pen, voice input device, touch input device, etc. Output device(s) 684 such as a display, speakers, printer, etc. may also be included. These devices are well known in the art and need not be discussed at length here.

The computing device 670 may also contain communication connections 686 that allow the device to communicate with other computing devices 688, such as over a network in a distributed computing environment, for example, an intranet or the Internet. Communication connection 686 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
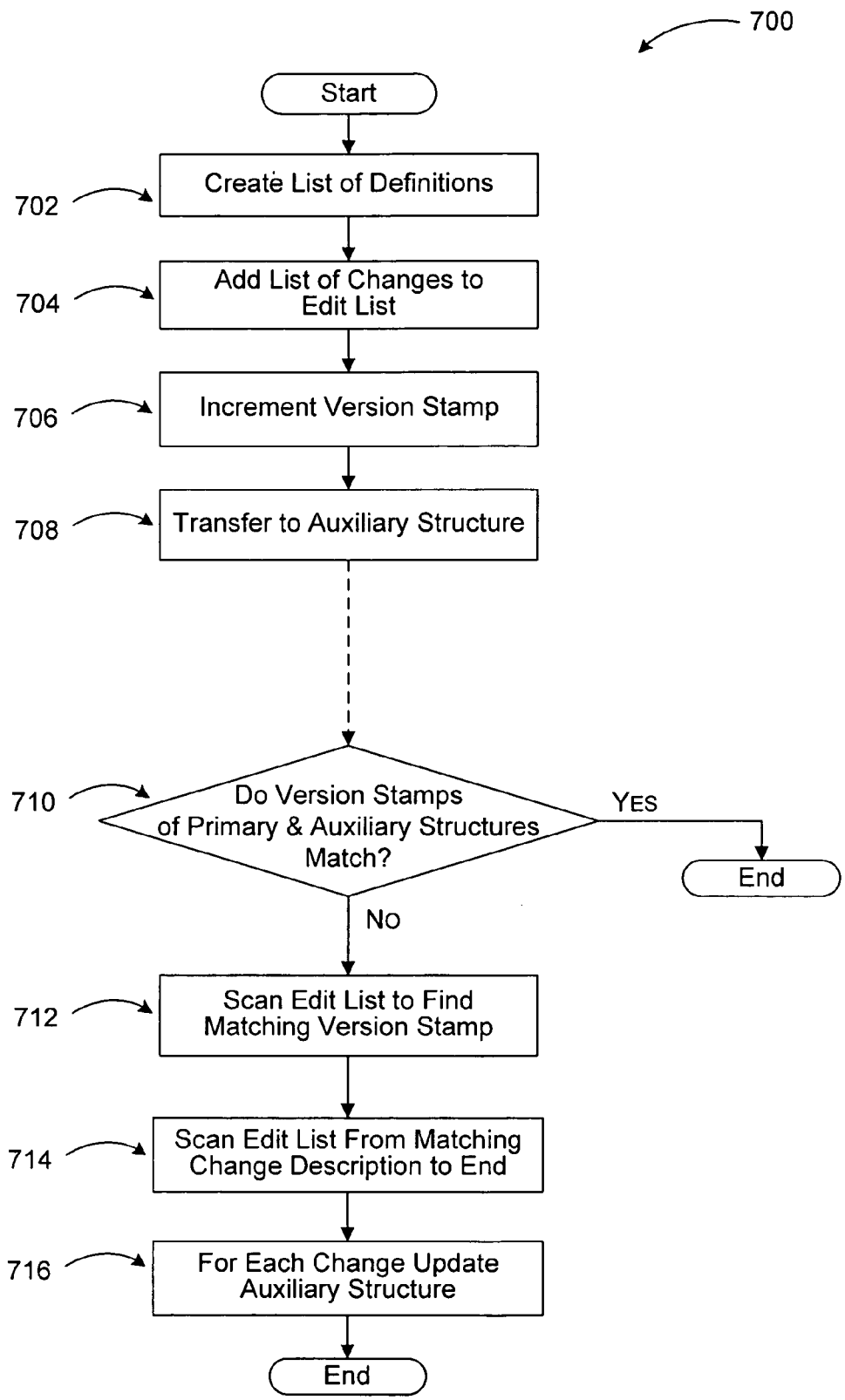
FIG. 7 illustrates a logic flow diagram for a process of using an edit list to update auxiliary data structures associated with a primary data structure.

FIG. 7 illustrates a logic flow diagram for a process of using an edit list to update auxiliary data structures associated with a primary data structure. Process 700 may be implemented in an application that edits primary and/or auxiliary data structures, an update module, and the like.

Process 700 begins with operation 702, where a list of definitions is created in an edit list in response to changes to a primary data structure. The definitions of the change descriptions tell an application associated with the auxiliary data structure what it can do with the change descriptions. Processing advances from operation 702 to operation 704.

At operation 704, a list of new changes in the primary data structure is added to the edit list. These changes may include addition of elements, removal of elements, formatting changes, and the like. Processing proceeds from operation 704 to operation 706.

At operation 706, a version stamp for the primary data structure is incremented reflecting the addition of the new changes to the edit list. According to some embodiments, the version stamp is incremented for each change entry in the edit list. This ensures integrity so that auxiliary structures can be updated at any time. According to other embodiments, updating the version stamp for a set of changes may also be implemented as long as access to the edit list by external updating engines is blocked during this time. Processing moves from operation 706 to operation 708.

At operation 708, the updated edit list is made available for use in incrementally updating one or more auxiliary data structures. Once the edit list including the latest changes is available, the auxiliary data structure(s) can be updated on-demand. The operations up to operation 708 form a first portion of the process of using an edit list to update auxiliary data structures associated with a primary data structure. A second portion of the process begins with decision operation 710 initiating the update sub-process of the auxiliary data structure. This relationship is illustrated in the flowchart with a dashed line between operation 708 and decision operation 710.

At decision operation 710, version stamps of the primary and auxiliary data structures are compared to determine if they match. If the version stamps match, the edit list does not include any new changes since the last update of the auxiliary data structure, and processing ends. If the stamps do not match, processing continues to operation 712.

At operation 712, the edit list is scanned from the end to the beginning until a matching version stamp is found. The matching version stamp designates the point of last update in the list of change descriptions. Processing advances from operation 712 to operation 714.

At operation 714, the edit list is scanned from the matching version stamp to the end noting individual changes that have been added to the edit list since the last update. Processing advances from operation 714 to operation 716.

At operation 716, each new change noted in operation 714 is incorporated into the auxiliary data structure updating the auxiliary data structure incrementally. As such, operation 716 may be performed as a loop that occurs within operation 714 in case of multiple changes. When operation 716 is completed and no more changes are left to be incorporated, processing moves to a calling process for further actions.

The operations included in process 700 are for illustration purposes. Incrementally updating auxiliary data structures on-demand using an edit list may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computer-implemented method, executed at least in part in a computing device, for incrementally updating an auxiliary data structure associated with a primary data structure, the computer-implemented method comprising:
   in response to a change in the primary data structure, adding a change description associated with the change to an edit list, the change description comprising at least one of the following:
      a body change that requires a recalculation of the auxiliary data structure,
      text added, wherein at least one of the following is specified: a first starting character index position for the text added and a number of added characters,
      text removed, wherein at least one of the following is specified: a second starting character index position for the text removed and a number of removed characters, and
      a text format change that specifies a third starting character position and a number of formatted characters;
   incrementing, by the computing device, a primary version stamp for the primary data structure for each added change description in the edit list;
   when prompted to update the auxiliary data structure, determining whether the primary version stamp for the primary data structure matches an auxiliary version stamp for the auxiliary data structure;
   when the primary version stamp and the auxiliary version stamp are different, scanning the edit list to detect a matching version stamp for the primary data structure that matches the auxiliary version stamp for the auxiliary data structure; and
   implementing, incrementally, in the auxiliary data store, each change description added to the edit list after a matching change description corresponding to the matching version stamp was added to the edit list, wherein implementing, incrementally, each change description added to the edit list after the matching change description corresponding to the matching version stamp was added to the edit list comprises:
      implementing, in the auxiliary data structure, a change description added to the edit list immediately after the matching change description corresponding to the matching version stamp was added to the edit list,
      incrementing the auxiliary version stamp to account for the change description implemented in the auxiliary data structure,
      determining whether the primary version stamp matches the incremented auxiliary version stamp, and
      when it is determined that the primary version stamp and the incremented auxiliary version stamp are different:
         incrementing the matching version stamp, and
         repeating the stage of implementing, incrementally, in the auxiliary data store, each change description added to the edit list until it is determined, in the stage of determining whether the primary version stamp matches the incremented auxiliary version stamp, that the incremented auxiliary version stamp matches the primary version stamp.

2. The computer-implemented method of claim 1, further comprising:
   adding a definition associated with the change description to the edit list.

3. The computer-implemented method of claim 1, further comprising implementing changes from the matching version stamp towards the primary version stamp.

4. The computer-implemented method of claim 1, further comprising:
   when a plurality of changes are made to the primary data structure, incrementing the primary version stamp for the primary data structure after the change descriptions for the plurality of changes are added.

5. The computer-implemented method of claim 1, further comprising:
adding data associated with the change description to the edit list.

6. The computer-implemented method of claim 1, further comprising maintaining the edit list as one from a set of: a temporary file, an integrated part of the primary data structure, an integrated part of the auxiliary data structure, and a separate file.

7. The computer-implemented method of claim 1, wherein adding the change description associated with the change to the edit list comprises adding the change description associated with the change to an Extensible Markup Language (XML) document.

8. The computer-implemented method of claim 1, further comprising updating the auxiliary data structure by one of: a first application associated with the primary data structure, a second application associated with the auxiliary data structure, and an update application.

9. The computer-implemented method of claim 8, further comprising:
providing the edit list for updating the auxiliary data structure through one of: a network communication and a portable computer-readable medium.

10. A system for incrementally updating an auxiliary data structure associated with a primary data structure, the system comprising:
a memory storage;
a processing unit coupled to the memory storage, wherein the processing unit is operative to:
add a change description to an edit list in response to a primary data structure change, the change description comprising at least one of the following:
a body change that represents the primary data structure change requiring a recalculation of the auxiliary data structure,
an element added, wherein at least one of the following is specified: a first starting character index position for the element added and a number of added characters,
an element removed, wherein at least one of the following is specified: a second starting character index position for the element removed and a number of removed characters, and
a format change that specifies a third starting character position and a number of formatted characters;
add a definition associated with the change description to the edit list;
increment a primary version stamp for the primary data structure;
when prompted to update the auxiliary data structure, determine whether the primary version stamp for the primary data structure matches an auxiliary version stamp for the auxiliary data structure;
when the primary version stamp and the auxiliary version stamp are different, scan the edit list to detect a matching version stamp for the primary data structure that matches the auxiliary version stamp for the auxiliary data structure;
implement any changes in the edit list added subsequent to the matching version stamp in the auxiliary data structure incrementally;
increment the auxiliary version stamp to account for each implemented change; and when a plurality of change descriptions have been added to the edit list subsequent to a change description corresponding to the matching version stamp in the edit list,
implement, incrementally, in the auxiliary data store, each change description added to the edit list after a matching change description corresponding to the matching version stamp was added to the edit list,
increment the auxiliary version stamp to account for the change description implemented in the auxiliary data structure,
determine whether the primary version stamp matches the incremented auxiliary version stamp, and
when it is determined that the primary version stamp and the incremented auxiliary version stamp are different:
increment the matching version stamp, and
repeat the increment implementation of each change description added to the edit list until it is determined that the incremented auxiliary version stamp matches the primary version stamp.

11. The system of claim 10, wherein the processor is further operative to set a flag associated with one of: an indication that the body change was encountered in the primary data structure, an indication that the element was added to the primary data structure, an indication that the element was removed from the primary data structure, and an indication that the formatting change was encountered in the primary data structure.

12. The system of claim 11, wherein one of the element added and the element removed is a group of characters in a character stream defined by the primary data structure and wherein the auxiliary data structure includes a subset of the defined character stream.

13. The system of claim 10, wherein the processor is further operative to provide the edit list to an application executed in another system for updating another auxiliary data structure associated with the primary data structure.

14. A computer readable storage medium having a set of instructions which when executed perform a method for incrementally updating an auxiliary data structure associated with a primary data structure, the method executed by the set of instructions comprising:
in response to a change in the primary data structure, adding a change description associated with the change in the primary data structure to an edit list, the change description comprising at least one of the following:
a body change that requires a recalculation of the auxiliary data structure,
text added, wherein at least one of the following is specified: a first starting character index position for the text added and a number of added characters,
text removed, wherein at least one of the following is specified: a second starting character index position for the text removed and a number of removed characters, and
a text format change that specifies a third starting character position and a number of formatted characters, wherein the edit list is maintained as one of the following: a temporary file, an integrated part of the primary data structure, an integrated part of the auxiliary data structure, and a separate file;
incrementing a primary version stamp for the primary data structure;

when prompted to update the auxiliary data structure, determining whether the primary version stamp for the primary data structure matches an auxiliary version stamp for the auxiliary data structure, the auxiliary data structure being updated from at least one of the following:
  a first application associated with the primary data structure,
  a second application associated with the auxiliary data structure, and
  an update application;
implementing, incrementally, in the auxiliary data store, each change description added to the edit list after a matching change description corresponding to the matching version stamp was added to the edit list, wherein implementing, incrementally, each change description added to the edit list after the matching change description corresponding to the matching version stamp was added to the edit list comprises:
  implementing, in the auxiliary data structure, a change description added to the edit list immediately after the matching change description corresponding to the matching version stamp was added to the edit list,
  incrementing the auxiliary version stamp to account for the change description implemented in the auxiliary data structure,
  determining whether the primary version stamp matches the incremented auxiliary version stamp, and
  when it is determined that the primary version stamp and the incremented auxiliary version stamp are different:
    incrementing the matching version stamp, and
    repeating the stage of implementing, incrementally, in the auxiliary data store, each change description added to the edit list until it is determined, in the stage of determining whether the primary version stamp matches the incremented auxiliary version stamp, that the incremented auxiliary version stamp matches the primary version stamp.

15. The computer readable storage medium of claim 14, further comprising adding a definition associated with the change description to the edit list.

16. The computer readable storage medium of claim 14, wherein scanning the edit list to detect the matching version stamp for the primary data structure further comprises implementing changes from the matching version stamp towards the primary version stamp.

17. The computer readable storage medium of claim 14, further comprising, when a plurality of changes are made to the primary data structure, incrementing the primary version stamp for the primary data structure after the change descriptions for the plurality of changes are added.

18. The computer readable storage medium of claim 14, further comprising adding data associated with the change description to the edit list.

19. The computer readable storage medium of claim 14, wherein scanning the edit list comprises scanning an Extensible Markup Language (XML) document.

20. The computer readable storage medium of claim 14, further comprising providing the edit list for updating the data structure through one of: a network communication and a portable computer-readable medium.

* * * * *